(12) United States Patent
Hooper et al.

(10) Patent No.: US 9,448,959 B2
(45) Date of Patent: Sep. 20, 2016

(54) TWO-WIRE COMMUNICATION PROTOCOL ENGINE

(71) Applicant: ANALOG DEVICES, INC., Norwood, MA (US)

(72) Inventors: William Hooper, Newton, MA (US);
Martin Kessler, Somerville, MA (US);
Lewis F. Lahr, Dover, MA (US);
Michael Giancioppo, Wilmington, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 427 days.

(21) Appl. No.: 14/063,886

(22) Filed: Oct. 25, 2013

(65) Prior Publication Data

US 2014/0101351 A1  Apr. 10, 2014

Related U.S. Application Data

(63) Continuation-in-part of application No. 13/646,397, filed on Oct. 5, 2012, and a continuation-in-part of application No. 13/646,382, filed on Oct. 5, 2012, now Pat. No. 8,990,464.

(Continued)

(51) Int. Cl.
*G06F 13/00* (2006.01)
*G06F 13/42* (2006.01)
*G06F 13/364* (2006.01)
(Continued)

(52) U.S. Cl.
CPC ............. *G06F 13/42* (2013.01); *G06F 13/364* (2013.01); *G06F 13/4256* (2013.01); *G06F 13/4273* (2013.01); *H04B 3/50* (2013.01); *H04L 1/16* (2013.01); *H04L 2001/0093* (2013.01)

(58) Field of Classification Search
USPC ........................................................ 710/110
See application file for complete search history.

(56) References Cited

U.S. PATENT DOCUMENTS 4,965,881 A   10/1990  Dilley
5,235,595 A *  8/1993  O'Dowd ............... H04L 12/433
                                              370/392

(Continued)

FOREIGN PATENT DOCUMENTS

EP        798901      10/1997
JP     2009/543279    12/2009

(Continued)

OTHER PUBLICATIONS

Manchester Encoding. 1949.*

(Continued)

*Primary Examiner* — Paul R Myers
(74) *Attorney, Agent, or Firm* — Patent Capital Group (57) ABSTRACT

In an example embodiment, a two-wire communication protocol engine manages control and data transmissions in a bi-directional, multi-node bus system where each node is connected over a twisted wire pair bus to another node. Some embodiments include a state machine that allows for synchronized updates of configuration data across the system, a distributed interrupt system, a synchronization pattern based on data coding used in the system, and data scrambling applied to a portion of the data transmitted over the twisted wire pair bus. The multi-node bus system comprises a master node and a plurality of slave nodes. The slave nodes can be powered over the twisted wire pair bus.

20 Claims, 10 Drawing Sheets

Related U.S. Application Data (60) Provisional application No. 61/843,891, filed on Jul. 8, 2013, provisional application No. 61/843,896, filed on Jul. 8, 2013, provisional application No. 61/843,902, filed on Jul. 8, 2013, provisional application No. 61/845,542, filed on Jul. 12, 2013.

(51) Int. Cl.
  *H04B 3/50* (2006.01)
  *H04L 1/16* (2006.01)
  *H04L 1/00* (2006.01)

(56) References Cited

U.S. PATENT DOCUMENTS

| | | | |
|---|---|---|---|
| 5,675,811 A * | 10/1997 | Broedner | G06F 13/4291 710/104 |
| 5,841,989 A * | 11/1998 | James | H04L 45/00 709/239 |
| 5,935,229 A * | 8/1999 | Duval | G06F 13/12 370/452 |
| 6,609,167 B1 * | 8/2003 | Bastiani | G06F 13/4291 710/10 |
| 6,629,172 B1 | 9/2003 | Andersson et al. | |
| 6,745,270 B1 | 6/2004 | Barenys et al. | |
| 6,813,777 B1 * | 11/2004 | Weinberger | H04B 7/18508 348/E5.008 |
| 6,928,501 B2 | 8/2005 | Andreas et al. | |
| 6,985,503 B1 * | 1/2006 | DeGrandpre | H04L 25/14 370/413 |
| 7,673,084 B2 | 3/2010 | Krampl et al. | |
| 8,205,017 B2 | 6/2012 | Parr et al. | |
| 8,391,180 B2 * | 3/2013 | Karandikar | H04L 12/437 370/254 |
| 8,543,740 B2 | 9/2013 | Lotzenburger et al. | |
| 8,990,464 B2 | 3/2015 | Kessler | |
| 2003/0097482 A1 | 5/2003 | DeHart | H04L 29/06 709/253 |
| 2005/0128962 A1 | 6/2005 | Dybsetter et al. | |
| 2008/0016269 A1 * | 1/2008 | Chow | G06F 13/1684 711/103 |
| 2009/0021955 A1 | 1/2009 | Kuang | |
| 2010/0257303 A1 | 10/2010 | Lee et al. | |
| 2010/0260247 A1 * | 10/2010 | Albiston | H04B 3/548 375/222 |
| 2011/0028150 A1 * | 2/2011 | Kone | H04W 36/0061 455/436 |
| 2012/0076146 A1 * | 3/2012 | Rohatschek | H04L 12/422 370/392 |
| 2012/0076319 A1 * | 3/2012 | Terwal | G06F 17/3074 381/86 |
| 2013/0124763 A1 | 5/2013 | Kessler | |

FOREIGN PATENT DOCUMENTS

| | | |
|---|---|---|
| WO | 2008/001274 | 1/2008 |
| WO | 2008/114777 | 9/2008 |
| WO | 2013/052886 | 4/2013 |

OTHER PUBLICATIONS

PCI Express Base Specification Revision 3.0 Nov. 2010.*
European Patent Application Serial No. 14173943.3 filed Jun. 20, 2014.
Extended Search Report for European Patent Application Serial No. 14173943.3 mailed Nov. 5, 2014.
Unpublished U.S. Appl. No. 14/102,603 entitled "Power Switching in a Two-Wire Conductor System" filed Dec. 11, 2013, 37 pages.
Unpublished European Patent Application Serial No. 14175269.1 filed Jul. 1, 2014.
Notice of Publication of Application for European Patent Application Serial No. 14175269.1 dated Jan. 21, 2015, 2 pages.
Unpublished U.S. Appl. No. 13/646,397 entitled "Two-Wire Communication System for High Speed Data and Power Distribution" filed Oct. 5, 2012, 127 pages.
Unpublished U.S. Appl. No. 13/646,382 entitled "Methods for Discovery, Configuration, and Coordinating Data Communications Between Masters and Slave Devices in a Communication System" filed Oct. 5, 2012, 122 pages.
Non-Final Office Action in U.S. Appl. No. 13/646,382 mailed Jul. 2, 2014, 11 pages.
Notice of Allowance in U.S. Appl. No. 13/646,382 mailed Nov. 26, 2014, 5 pages.
Unpublished European Patent Application Serial No. 12779236.4 filed Apr. 28, 2014.
Office Action in EP12779236.4 mailed Jun. 2, 2014, 2 pages.
International Search Report in PCT/US2012/059084 mailed Oct. 4, 2013, 5 pages.
Response to EP Office Action in European Patent Application Serial No. 12779236.4, filed Nov. 17, 2014, 33 pages.
Unpublished Japanese Patent Application Serial No. 2014-534801 filed Dec. 18, 2014.
Office Action in Japan Patent Application Serial No. 2014-534801 mailed Jan. 23, 2015, 4 pages.
English Translation of Japan Patent Application Serial No. 2014-534801 mailed Jan. 23, 2015, 5 pages.
Non-Final Office Action (Notice of Preliminary Rejection) in Korean Patent Application Serial No. 10-2014-82367 mailed Feb. 26, 2014, 4 pages.
English Summary of Non-Final Office Action (Notice of Preliminary Rejection) in Korean Patent Application Serial No. 10-2014-82367 mailed Feb. 26, 2014, 2 pages.
Response to JP Office Action issued in JP Patent Application Serial No. 2014-534801 filed Apr. 23, 2015, 20 pages [Japanese].
English Translation of as-filed Amended Claim in Response to Office Action issued in JP Patent Application Serial No. 2014-534801 filed Apr. 23, 2015, 18 pages.

* cited by examiner

TWO-WIRE COMMUNICATION PROTOCOL ENGINE

CROSS-REFERENCE TO RELATED APPLICATIONS

This application claims the benefit of priority under 35 U.S.C. §119(e) to U.S. Provisional Application Ser. No. 61/843,891, entitled "A2B Protocol Engine" filed Jul. 8, 2013, U.S. Provisional Application Ser. No. 61/843,896, entitled "Digital Phase Detector" filed Jul. 8, 2013, U.S. Provisional Application Ser. No. 61/843,902, entitled "Differential Decoder" filed Jul. 8, 2013, U.S. Provisional Application Ser. No. 61/845,542, entitled "System and Method for Implementing A2B Protocol" filed Jul. 12, 2013, which are hereby incorporated by reference in their entireties. This application is also a continuation-in-part and claims the benefit of priority under 35 U.S.C. §120 of U.S. application Ser. No. 13/646,397, filed Oct. 5, 2012, entitled "Two-Wire Communication System for High Speed Data and Power Distribution" and U.S. application Ser. No. 13/646,382, filed Oct. 5, 2012, entitled "Methods for Discovery, Configuration, and Coordinating Data Communications Between Masters and Slave Devices in a Communication System." The disclosures of the prior Applications are considered part of and are incorporated by reference in the disclosure of this Application.

TECHNICAL FIELD OF THE DISCLOSURE

The present disclosure relates generally to communication bus technology and, more particularly, to a two-wire communication protocol engine.

BACKGROUND

Two-wire conductor systems are known in electrical and electronics fields as a means of data and power transmission. Such systems typically employ a controller that drives power into two wire conductors, controls the timing of data transfer and transmits and receives data. A master device (also called a master node) is controlled by the controller, and the master node in turn controls one or more slave devices (also called slave nodes). Generally, communication on the two-wire conductor system involves sending a clock signal on one wire and data signal on the other wire, with the rise and/or fall of the clock signal indicating data transfer between the connected devices. Two-wire conductor systems can be used in myriad applications, such as control systems in automobiles, audio signal processing, telephony, etc.

OVERVIEW

The present disclosure relates generally to a two-wire communication protocol engine. Specifically, proliferation of sensors, such as microphones, cameras, etc. in automobiles (and other such closed and/or mobile systems that utilize sensors and other peripheral devices) can lead to excessive amount of wiring, with consequent increase in system complexity and weight, and potential decrease in performance and reliability. A particular type of two-wire communication, called automobile audio bus ($A^2B$) communication, can be used in automobiles and other similar systems to reduce complexity of data and power transmission across the various sensors and sensor control devices. The $A^2B$ bus provides a multi-channel, Inter-Integrated Circuit sound ($I^2S$)/time division multiplexed (TDM) link between connected nodes. It embeds bi-directional synchronous data (e.g., digital audio), clock and synchronization signals onto a single differential wire pair. $A^2B$ supports a direct point-to-point connection and allows multiple, daisy chained nodes at different locations to contribute or consume TDM channel content. The $A^2B$ bus allows time for downstream traffic (e.g., from the master node to the last slave node) and upstream traffic (e.g., to the master node) and allows power transmission over the same twisted wire pair.

In an example embodiment, a two-wire communication ($A^2B$) protocol engine manages control and data transmissions in a bi-directional, multi-node bus system where each node is connected over a twisted wire pair bus to another node. Some embodiments include a state machine that allows for synchronized updates of configuration data across the system, a distributed interrupt system, a synchronization pattern based on data coding used in the system, and data scrambling applied to a portion of the data transmitted over the twisted wire pair bus. The multi-node bus system comprises a master node and a plurality of slave nodes. The slave nodes can be powered over the twisted wire pair bus.

DESCRIPTION OF EXAMPLE EMBODIMENTS OF THE DISCLOSURE

Figure 1:
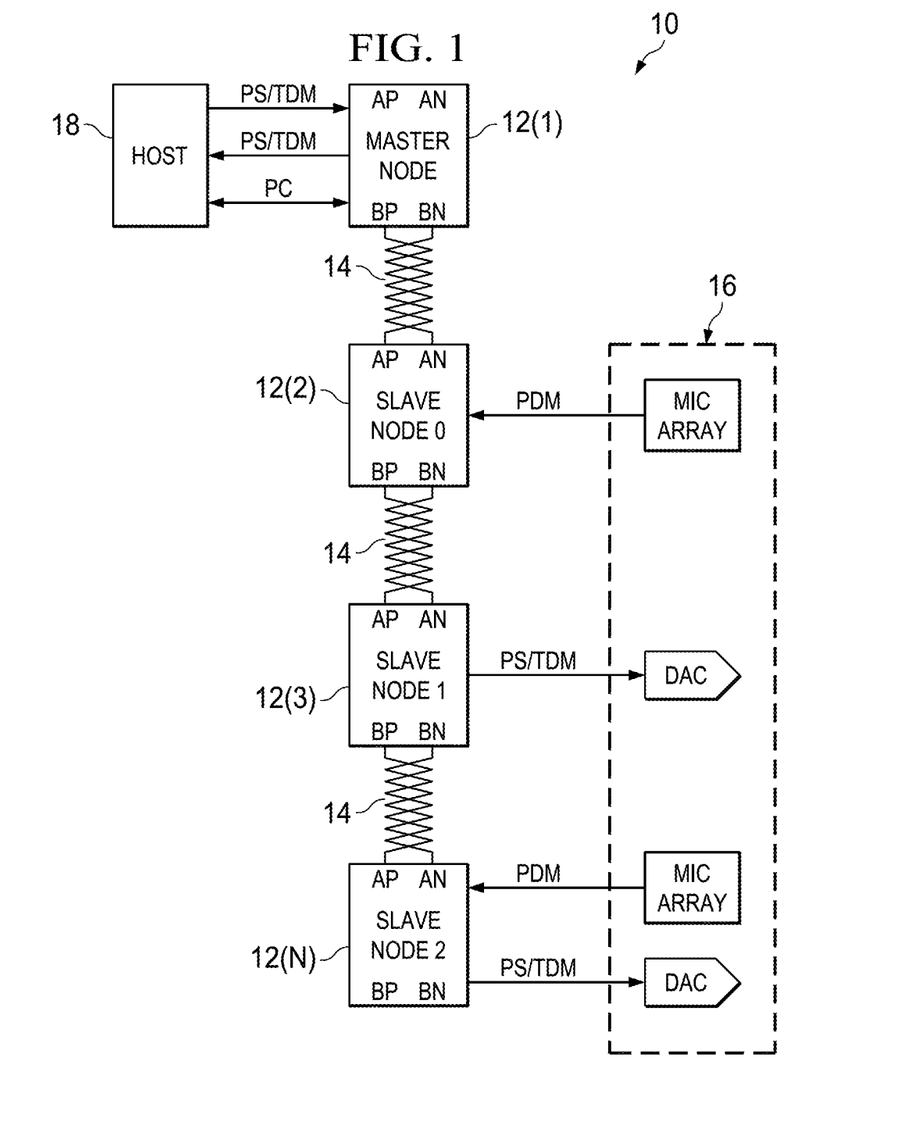
FIG. 1 is a simplified block diagram illustrating a schematic of an illustrative system including a two-wire communication protocol engine.

FIG. 1 is a simplified block diagram illustrating a system 10 including a two-wire communication protocol engine. System 10 comprises a plurality of nodes 12(1)-12(N). 12(1) represents a master node, which communicates with three slave nodes 12(2)-12(N) over a twisted wire pair bus 14 using a two-wire communication protocol (e.g., $A^2B$ protocol). Each slave node 12(2)-12(N) may read and/or write data from/to one or more sensors or other peripheral devices 16. Examples of peripheral devices include microphones (mics), mic arrays, digital to analog converters (DACs), etc. A host controller 18 may communicate with and control master node 12(1) over multi-channel $I^2S$ and Inter-Integrated Circuit ($I^2C$) communication protocols. Embodiments of the $A^2B$ protocol engine may allow for control information and audio data to be transmitted in both directions using twisted wire pair bus 14 to connect each node to the next one. Slave nodes 12(2)-12(N) can also be powered by twisted wire pair 14.

As used herein, the term "node" refers to an integrated circuit, device or other such object capable of sending and receiving data (e.g., electrical signals) over appropriate communications channels in an electrical circuit. The "master node" comprises an originator of a clock signal (e.g., which can be derived from an $I^2S$ input), downstream data, network control and power; the master node is programmed by host controller 18 (e.g., microprocessor), and it receives/sends payload to/from host controller 18. The "slave node" comprises an addressable network connection point that can represent a possible destination for downstream data frames (e.g., single block of payload of a specific node with possibly multiple synchronous data slots of content) and source of upstream data frames. Synchronous data refers to continuously streamed data (e.g., audio signal) in which a fixed time interval (e.g., 48 kHz) and a fixed phase spaces two corresponding transitions.

In various embodiments, each node 12(1)-12(N) may include an $A^2B$ protocol engine implemented, for example, in a portion of an integrated circuit. In various embodiments, the $A^2B$ protocol engine manages control and data transmissions in the linear, bi-directional, multi-node bus system. According to various embodiments, the integrated circuit comprising the $A^2B$ protocol engine can work well in a noisy environment, for example, by minimizing electromagnetic emissions. Each protocol engine may include a state machine that allows for synchronized updates of programmed data across system 10, a distributed interrupt system, a synchronization pattern based on data coding used in the two-wire communication protocol, and data scrambling applied to a portion of the data traversing twisted wire pair bus 14. Another feature includes a simplified floating-point compression to compress data before it is transmitted across twisted wire pair bus 14.

In a general sense, the $A^2B$ protocol can connect multi-channel $I^2S$ synchronous, pulse code modulated (PCM) data between nodes 12(1)-12(N). The $A^2B$ protocol can also extend the synchronous, time division multiplexed (TDM) nature of $I^2S$ to system 10 that connects multiple nodes 12(1)-12(N), where each node 12(1)-12(N) can consume data, provide data, or both.

According to various embodiments, master node 12(1) may be configured (e.g., programmed, designed, etc.) through an integrated $I^2C$ port. Master node 12(1) may generate downstream $A^2B$ transactions (e.g., data signals, power signals, etc.) and receive upstream $A^2B$ transactions. Data received via twisted wire pair 14 may be written into an $A^2B$ frame buffer and transmitted out of master node 12(1) through two $I^2S$ transmitters. Data to be transmitted via $A^2B$ may be read from the $A^2B$ frame buffer, which may be filled by two $I^2S$ receivers. In some embodiments, master node 12(1) comprises state machines to manage the $A^2B$ protocol including discovery (e.g., of slave nodes 12(2)-12(N)), broadcast writes (e.g., of system wide information, configuration changes, etc.), CRC generation of synchronization control frames, cyclic redundancy check (CRC) error detection and handling for synchronization response frames, CRC error detection and handling for interrupt frames, parity generation for downstream data, and parity checks and error handling for upstream data (among other features).

Each slave node 12(2)-12(N) may be configured through the upstream $A^2B$ port. Each slave node 12(2)-12(N) may receive downstream $A^2B$ transactions and optionally retransmit the transactions further downstream. Each slave node 12(2)-12(N) may either receive or generate upstream $A^2B$ transactions, optionally retransmit data upstream, and optionally add data to the upstream transaction. Data received via $A^2B$ may be written into the $A^2B$ frame buffer and transmitted out through two $I^2S$ transmitters. Data to be transmitted via $A^2B$ may be read from the $A^2B$ frame buffer, which may be filled by two $I^2S$ receivers and/or by a PDM interface. Each slave node 12(2)-12(N) may comprise corresponding state machines to manage $A^2B$ protocol, similar to the state machine on master node 12(2). The $I^2C$ Interface of each slave node 12(2)-12(N) may be used as a master to control attached nodes. Commands may be sent from host controller 18 over twisted wire pair bus 14 and passed to a slave node through the $I^2C$ Interface. The $A^2B$ protocol can comprise a single-master, multiple-slave system where master node 12(1) is controlled by host controller 18. Host controller 18 can generate a periodic synchronization signal on its $I^2S$ TDM interface at a fixed frequency (e.g., 48 kHz) to which all $A^2B$ nodes 12(1)-12(N) may synchronize.

During operation, when system 10 is communicating data between various nodes 12(2)-12(N), each node may be configured to handle data on twisted wire pair bus 14. Communications along $A^2B$ twisted wire pair bus 14 occurs in periodic superframes. Each superframe is divided into periods of downstream transmission (also called downstream portions), upstream transmission (also called upstream portions), and no transmission (where the bus is not driven). For example, master node 12(1) may be programmed with a number of downstream portions to transmit to slave nodes 12(2)-12(N), and a number of upstream portions to receive from slave nodes 12(2)-12(N). Slave nodes 12(2)-12(N) may be programmed with a number of downstream portions to retransmit down $A^2B$ twisted wire pair bus 14, a number of downstream portions to consume, a number of upstream portions to retransmit up $A^2B$ twisted wire pair bus 14, and a number of upstream portions to transmit received data from corresponding peripheral devices 16.

It may be noted that although only four nodes 12(1)-12(N) are shown herein for sake of simplicity, any number of nodes may be interconnected in a similar manner within the broad scope of the embodiments of system 10. Moreover, each slave node 12(2)-12(N) may communicate with any number of peripheral devices within the broad scope of the embodiments.

Figure 2:
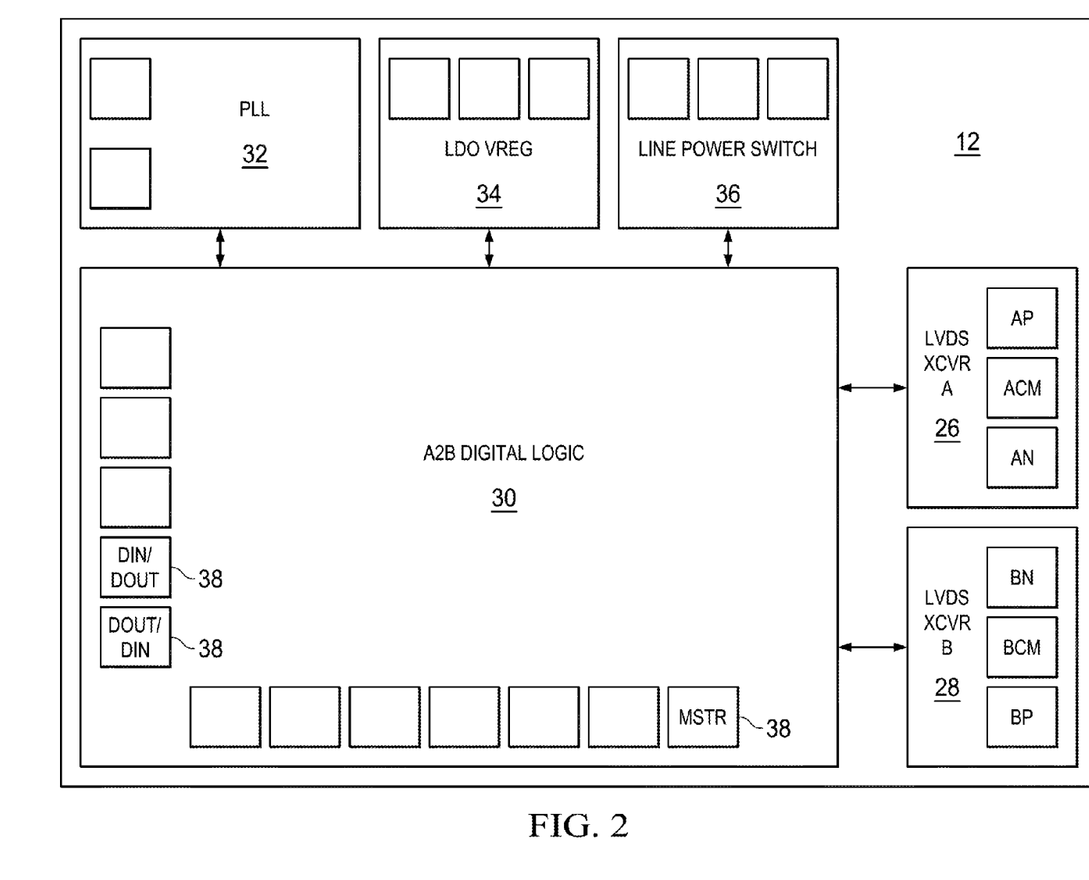
FIG. 2 is a simplified block diagram illustrating example details of an embodiment of the system.

Turning to FIG. 2, FIG. 2 is a simplified block diagram illustrating an example node 12 according to an embodiment of system 10. Node 12 can include two Low Voltage Differential Signaling (LVDS) transceivers (XCVRs), namely, LVDS XCVR 26 and LVDS XCVR 28. Each LVDS transceiver 26 and 28 has a positive pad (P) and a negative pad (N). The positive pad (e.g., AP) of one transceiver on one node connects to another positive pad (e.g., BP) on another transceiver on another node. Likewise, the negative pad (e.g., AN) of one transceiver on one node connects to another negative pad (e.g., BN) on another transceiver on another node. An A2B digital logic module 30 may communicate (e.g., through electronic signals) with a phased locked loop (PLL) 32, a low dropout regulator (LDO) 34 and a line power switch 36 (among other components). Various digital pads (e.g., pins) 38 may carry signals in and out of node 12.

Figure 3:
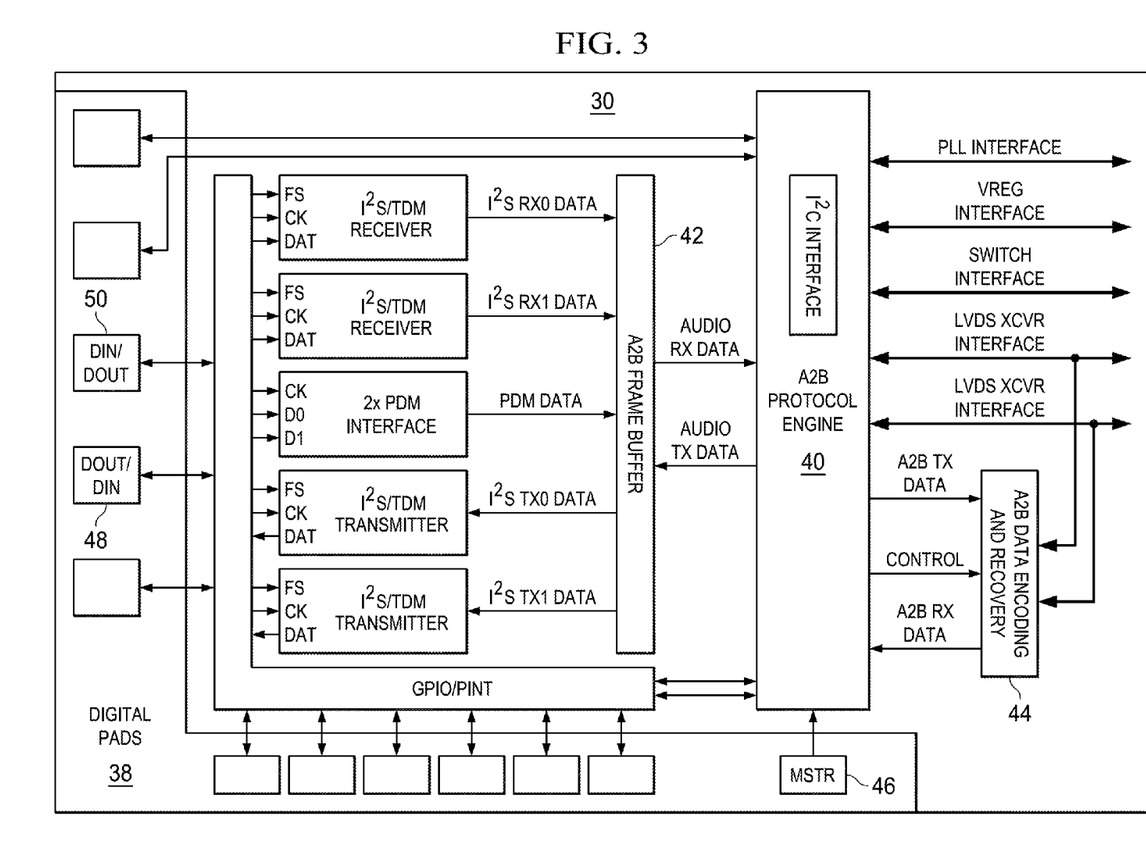
FIG. 3 is a simplified block diagram illustrating other example details of an embodiment of the system.

Turning to FIG. 3, FIG. 3 is a simplified block diagram illustrating an example A²B digital logic module 30 according to an embodiment of system 10. A²B digital logic module 30 may include an A²B protocol engine 40, an A²B frame buffer 42, and an A²B data encoding and recovery module 44 (among other components). Digital pads 38 may provide pins for various input/output functionalities. For example, node 12 may operate as an A²B master node when a MSTR pin 46 is held high and as a A²B slave node when MSTR pin 46 is held low. When node 12 is pin-programmed as a master node, then it may be a slave node to its I²S and I²C ports. If node 12 is pin-programmed as an A²B slave node, then it may function as the master node of its I²S and I²C ports.

A DOUT/DIN pin 48 may allow node 12 to create event driven interrupt requests towards host controller 18. DOUT/DIN pin 48 can serve as a general-purpose input/output (IO) pin in a slave node mode (e.g., when MSTR pin is set to low), with interrupt request input capability. A DIN/DOUT 50 pin can server as a digital input in a master mode (e.g., when MSTR pin 46 is set to high) and as a digital output in slave node (e.g., when MSTR pin 46 is set to low).

Figure 4:
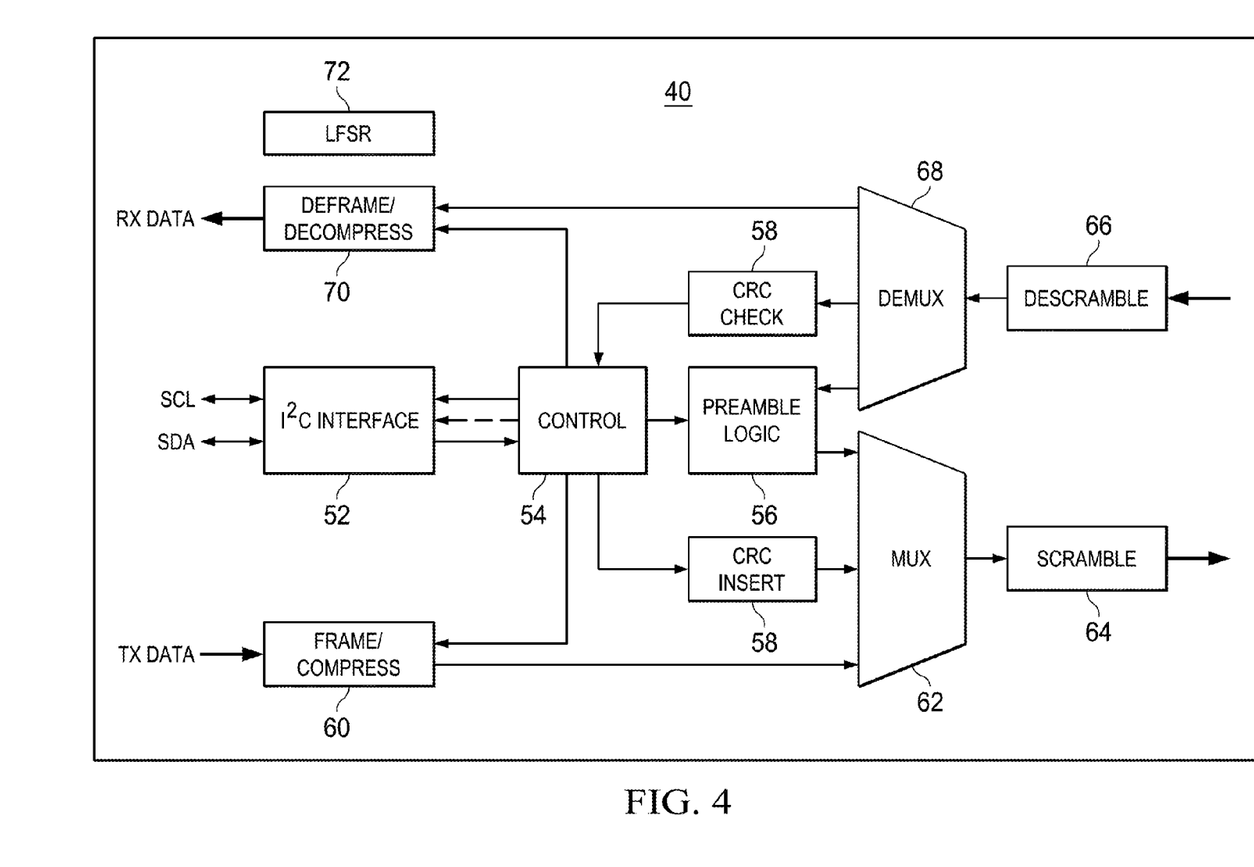
FIG. 4 is a simplified block diagram illustrating yet other example details of an embodiment of the system.

Turning to FIG. 4, FIG. 4 is a simplified block diagram illustrating example details of an A²B protocol engine 40 according to an embodiment of system 10. A²B protocol engine 40 may include an I²C Interface 52 that provides an I²C slave on a master node to allow programming access to host controller 18. I²C interface 52 may also provide an I²C master on a slave node to allow programming over distance from host controller 18. A²B protocol engine 40 may include a control module 54 that can control the A²B protocol, generate synchronization frames for transmission (TX), generates interrupt request (IRQ) frames for upstream TX, receive synchronization frames for reception (RX). Control module 54 may include programmable registers.

A preamble logic module 56 can generate a preamble for synchronization frames for TX, and receive preamble from synchronization frames from RX. In specific embodiments, a downstream control frame preamble is sent by master node 12(1) every 1024 bits. Slave nodes 12(2)-12(N) may synchronize to the downstream control preamble and generate their local, phase aligned master clock from the preamble. A CRC insert module 58 can generate CRC for synchronization frames for TX. A frame/compress module 60 can take data from A²B frame buffer 42, optionally compress data, and optionally generate parity for data. A Multiplexer (Mux) 62 may multiplex the preamble from preamble logic 56, synchronization frames, IRQ frames, and data into a TX stream. The TX stream may be scrambled by a scramble module 64.

The RX stream entering node 12 may be descrambled by a descramble module 66. A demultiplexer (Demux) 68 may demultiplex preamble, synchronization frames, IRQ frames, and data from the RX stream. Another CRC Check module 58 on the RX side may check received synchronization frames for correct CRC. A deframe/decompress module 70 may accept RX data, optionally check parity, optionally decompress data, and write the RX data to A²B frame buffer 42. An LFSR module 72 may generate a pseudo-random bit stream to be used in system evaluation.

Figure 5:
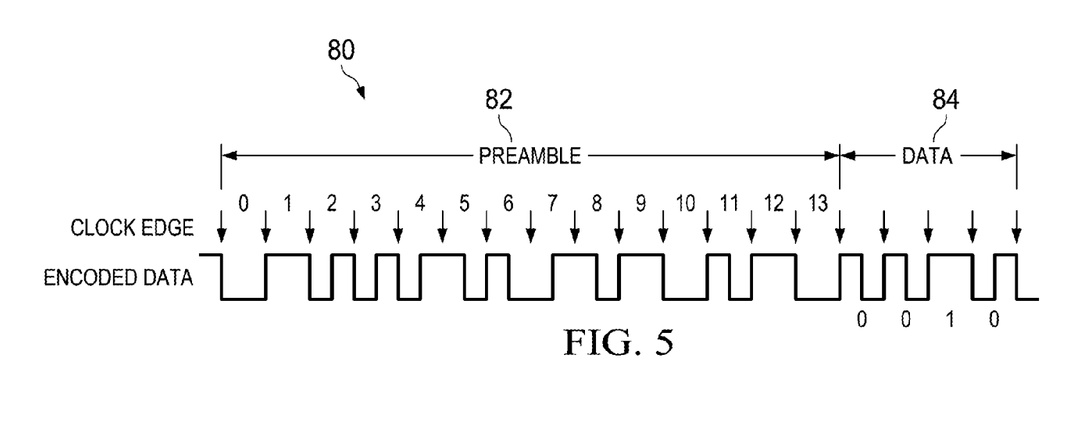
FIG. 5 is a simplified diagram illustrating yet other example details of an embodiment of the system.

Turning to FIG. 5, FIG. 5 is a simplified block diagram illustrating an example synchronization pattern 80 according to an embodiment of system 10. Because twisted wire bus 14 provides transmission in both directions, the A²B protocol is broken up into a downstream portion, wherein a control frame and downstream data are transmitted from the master node (e.g., 12(1)); and an upstream portion, wherein a response frame and upstream data are transmitted to the master node (e.g., 12(1)) from each of the slave nodes (e.g., 12(2)-12(N)). Each slave node (e.g., 12(2)-12(N)) can use a beginning portion of the received control frame as a time base feeding a PLL. Hence, the control frame may begin with a synchronization pattern that is not replicated by the data patterns.

According to various embodiments, clock first, transition on zero Differential Manchester Coding can used in the A2B protocol. According to the encoding scheme, each bit time begins with a clock transition. If the data value is zero, the encoded signal transitions again in the middle of the bit time. If the data value is one, the encoded signal does not transition again. Synchronization pattern 80 includes a preamble pattern 82 and a data pattern 84.

Preamble pattern 82 may violate the encoding protocol (e.g., clock transitions do not occur at the beginning of bit times 5, 7, and 8), which means that preamble pattern 82 may not match any legal (e.g., appropriate, correctly encoded) data pattern 84. In addition, preamble pattern 82 cannot be reproduced by taking a legal data pattern 84 and forcing twisted wire pair 14 high or low for a single bit time or for a multiple bit time period. In various embodiments, different preamble patterns that violate the encoding used for data pattern 84 may be implemented in synchronization pattern 80. The example preamble illustrated herein has pulse widths not longer than one bit clock, and is merely provided as an example, and not as a limitation of embodiments of system 10.

The A²B digital logic module can include a Differential Manchester decoder block that runs on a clock recovered from twisted wire pair bus 14 and that detects synchronization pattern 80 to send a frame sync pulse to the PLL. Hence, synchronization pattern 80 can be detected without using a system clock or a higher speed oversampling clock. Thus, the slave nodes (e.g., 12(2)-12(N)) can receive a PLL synchronization signal from twisted wire pair bus 14 without requiring a crystal clock source at the slave nodes (e.g., 12(2)-12(N)).

Figure 6:
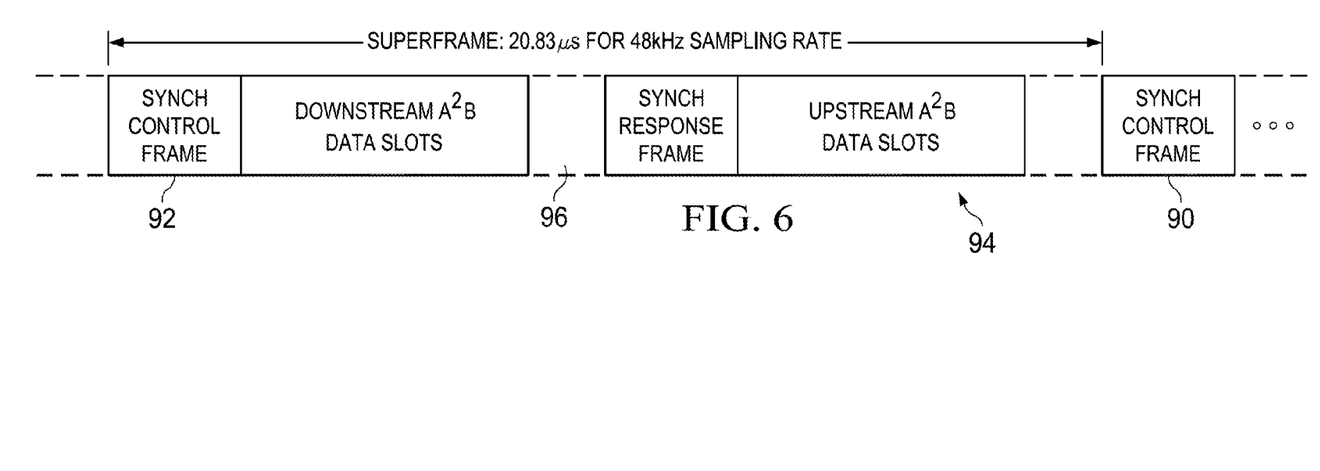
FIG. 6 is a simplified diagram illustrating yet other example details of an embodiment of the system.

Turning to FIG. 6, FIG. 6 is a simplified diagram of a superframe 90 used in the A²B protocol according to an embodiment of system 10. Communications along A²B twisted wire pair bus 14 can occur in periodic superframes. A superframe frequency may be same as a synchronization signal frequency. Data may be transferred at a bit rate that is 1024 time faster (e.g., 49.152 MHz). Each superframe 90 may be divided into periods of downstream transmission 92, upstream transmission 94, and no transmission 96 (e.g., wherein A²B twisted wire pair bus 14 is not driven).

Example superframe 90 is shown with an initial period of downstream transmission 92 and a later period of upstream transmission 94. Substantially all signals on A²B twisted wire bus 14 may be line coded and the synchronization signal forwarded downstream from the master node (e.g., 12(1)) to the last slave node (e.g., 12(N)) in a form of synchronization preamble pattern 82. Preamble pattern 82 may be followed by control data pattern 84 to build a synchronization control frame. Downstream, TDM synchronous data may be added directly after the control frame.

Each slave node (e.g., 12(2)-12(N)) may consume a portion of the downstream data. The last slave node (e.g., 12(N)) may respond after the response time with a response frame. Upstream synchronous data may be added by each slave node directly after the response frame. Substantially all synchronous data may be organized into data slots of equal width. A data slot refers to synchronous data signal of a single peripheral device 14 (e.g., microphone or speaker) as mapped onto twisted wire pair bus 14. Other slave nodes (e.g., 12(2)-12(3)), which are not the last slave node (e.g., 12(N)) may replace the response frame if a read of a register is requested in the control frame or if a remote $I^2C$ read is requested in the control frame. The embedded control frame and response frame can allow host controller 18 to individually address each slave node (e.g., 12(2)-12(N)).

Figure 7:
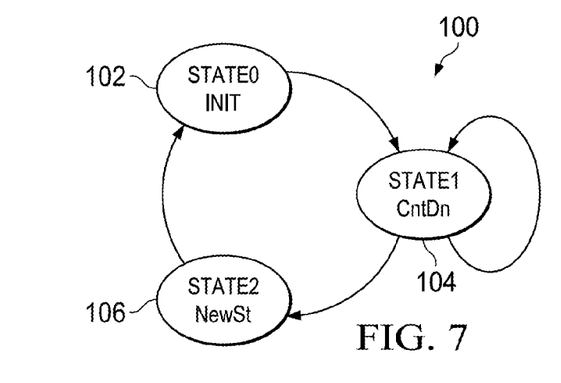
FIG. 7 is a simplified block diagram illustrating yet other example details of an embodiment of the system.

Turning to FIG. 7, FIG. 7 is a simplified diagram illustrating an example state machine 100 at master node 12(1) according to an embodiment of system 10. Each node 12(1)-12(N) may accept changes to its configuration (e.g., number of downstream and upstream portions of superframes to transmit, receive and consumer) simultaneously. Because system 10 is distributed and control and response frames may be corrupted by noise, the $A^2B$ protocol engine may include a state machine, for example, to synchronize the time at which changes to the configuration are accepted.

An example version of state machine 100 according to the $A^2B$ protocol starts with an initial state 102 of STATE0. When master node 12(1) is in the initial state 102 STATE0, it may receive a NEW STRUCTURE command (e.g., including configuration changes to one or more slave nodes 12(2)-12(N)). Master node 12(1) may broadcast a NEW STRUCTURE WRITE command to substantially all slave nodes 12(1)-12(N) and transition to a first state 104 STATE1. When master node 12(1) transitions to first state 104 STATE1, a counter register may be loaded with a predetermined non-zero value (e.g., 3). While in first state 104 STATE1, the current count may be decremented upon receiving a broadcast acknowledgement (ACK) message from the last slave node 12(N) and the value sent to the control frame. The broadcast acknowledgement may not be received by master node 12(1) if the control frame does not pass a CRC check at last slave node 12(N). The broadcast acknowledgement may not be accepted by master node 12(1) if the response frame does not pass a CRC check at master node 12(1). When the current count reaches 0, master node 12(1) may transition to second state 106 STATE2. The NEW STRUCTURE may be applied at the end of the upstream transfer while in second state 106 STATE2.

In the slave node version of state machine 100, each slave node 12(2)-12(N) may transition to first state 104 STATE1 from initial state 102 STATE0 on receiving a broadcast NEW STRUCTURE WRITE and the predetermined non-zero value (e.g., 3) may be loaded into a counter register. A broadcast NEW STRUCTURE WRITE with no CRC error may override the current count in first state 104 STATE1. In the absence of a valid broadcast NEW STRUCTURE WRITE, the current count may decrement in first state 104 STATE1. When the current count reaches zero, slave node 12(2)-12(N) may transition to second state 106 STATE2. The NEW STRUCTURE may be applied at the end of the upstream transfer while in second state 106 STATE2. In various embodiments, the control frame and/or response frame may be corrupted over more than the predetermined non-zero number (e.g., 3) of consecutive bus frames before the different nodes 12(1)-12(N) are out of sync with each other.

Figure 8:
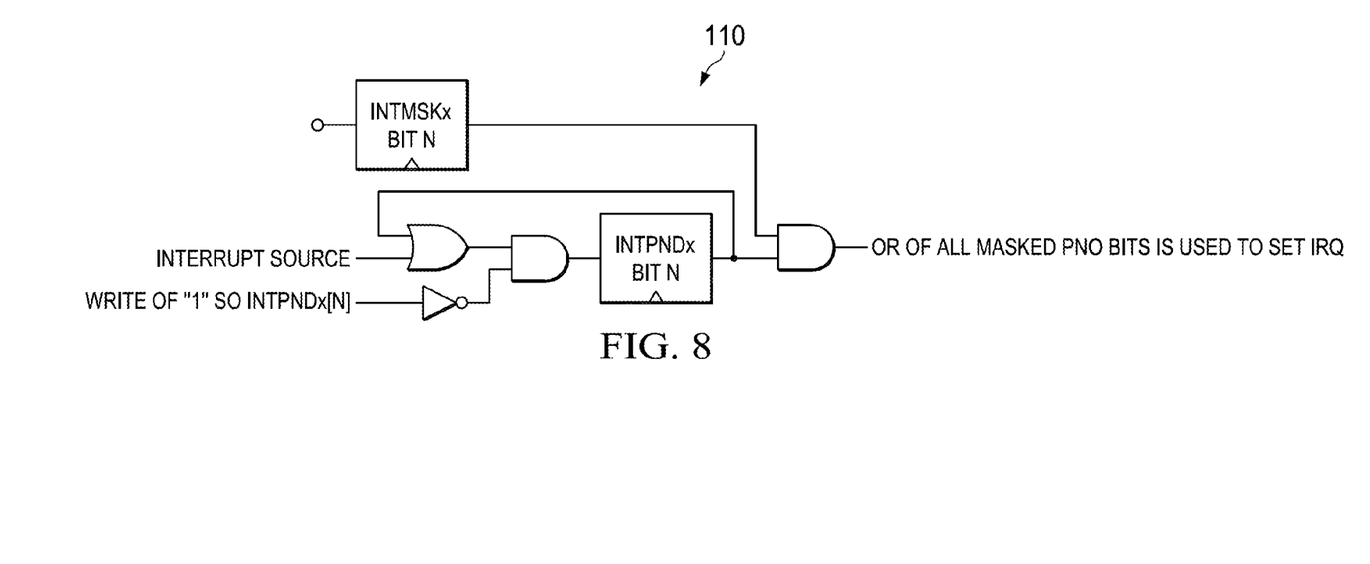
FIG. 8 is a simplified logic diagram illustrating yet other example details of an embodiment of the system.

Turning to FIG. 8, FIG. 8 is a simplified logic diagram illustrating example details of an interrupt system 110 according to an embodiment of system 10. Each node 12(1)-12(N) may be capable of reporting various errors (e.g., CRC error, data parity error, data decode error, etc.) as interrupts to host controller 18. Slave nodes 12(2)-12(N) may send an interrupt request to master node 12(1), which may signal host controller 18 through a dedicated interrupt pin. In various embodiments, the $A^2B$ protocol may include a distributed interrupt state machine, for example, to reduce interrupt overhead on host controller 18. When an interrupt from one of slave nodes 12(2)-12(N) is accepted by master node 12(1), master node 12(1) may signal the interrupt to host controller 18 as soon as possible.

When a new slave node interrupt is accepted, master node 12(1) may perform a read of pertinent slave node 12(2)-12(N) to acquire details on the interrupt and may store the details locally on master node 12(1). Master node 12(1) may clear the interrupt in pertinent slave node 12(2)-12(N) automatically (e.g., without user or host controller intervention). Because of the interrupt state machine, host controller 18 may read two registers from master node 12(1) to get substantially all of the details to handle the interrupt. One of the reads can also automatically clear the interrupt in master node 12(1) so that writes are not required to clear any interrupt.

$A^2B$ Protocol engine 40 may include a set of registers that provide support for interrupts to host controller 18. Example registers include INTSRC, INTTYPE, INTPND0, INTPND1, INTPDN2, INTMSK0, INTMSK1, and INTMSK2. An IRQ pin on master node 12(1) may be used to signal an interrupt to host controller 18. In an example embodiment, the IRQ pin can be cleared by a write of 1, and it may also be cleared on a host read of INTTYPE in master node 12(1). Thus, a write may not be necessary to clear the interrupt.

In one example embodiment, the INTSRC and INTTYPE registers includes the details that host controller 18 may use to determine the cause of the interrupt. The INTSRC register can indicate whether the active interrupt was generated by master node 12(1) or one of slave nodes 12(2)-12(N), including the identifier (ID) of slave node 12(2)-12(N) if any. When the IRQ pin is low or a pending interrupt has just been cleared and an interrupt is pending, priority logic may be used to determine the value to be written to the INTSRC register. The INTTYPE register may include additional details on the cause of the interrupt. When an interrupt generated by one of slave nodes 12(2)-12(N) becomes active, master node 12(1) may read the INTTYPE value from relevant one of slave nodes 12(2)-12(N) and write the INTTYPE value into the INTTYPE register in master node 12(1). Subsequently, master node 12(1) may clear the interrupt source in the slave node 12(2)-12(N).

Figure 9:
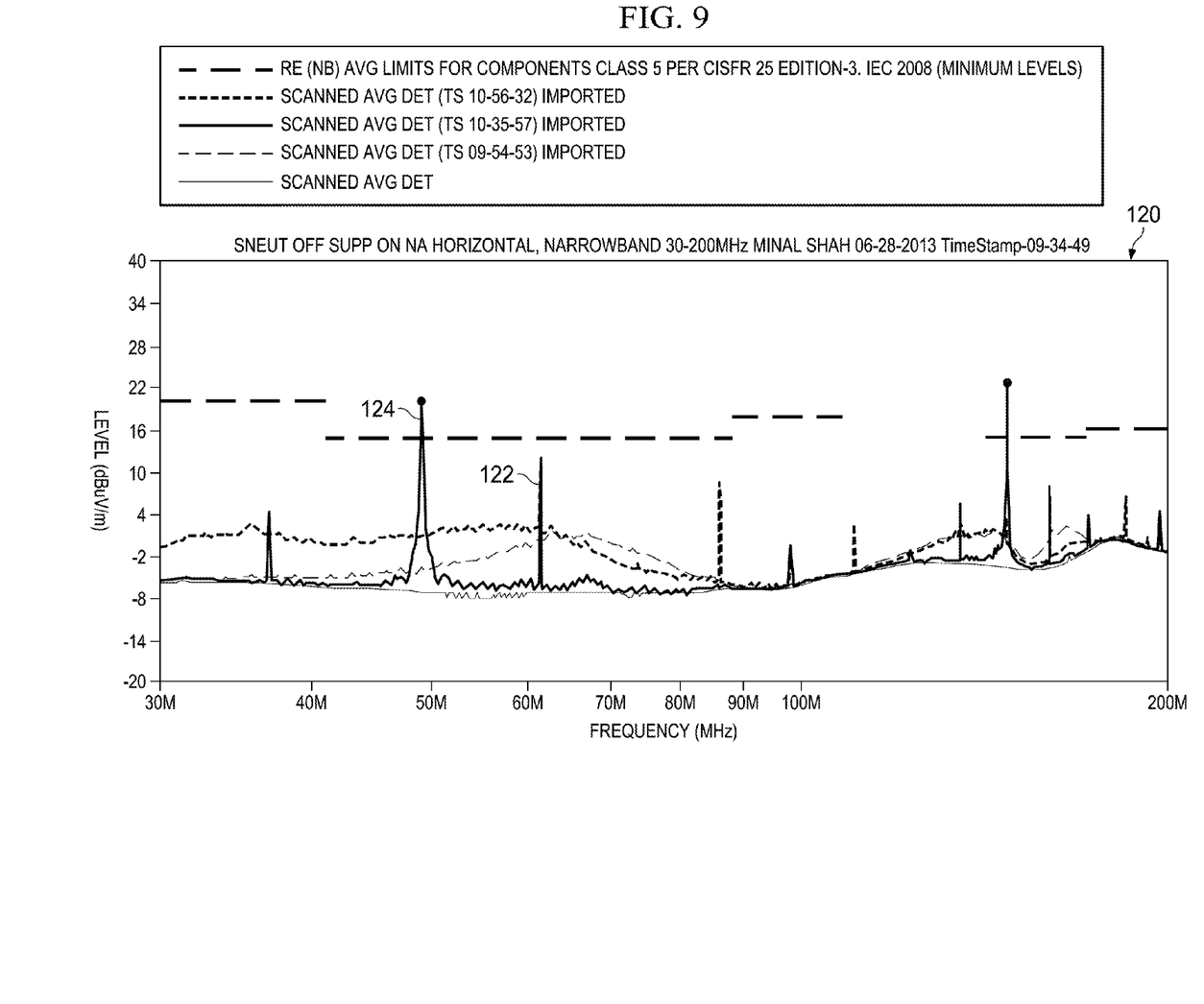
FIG. 9 is a simplified graph illustrating yet other example details of an embodiment of the system.

Turning to FIG. 9, FIG. 9 is a simplified graph 120 indicating comparisons of electromagnetic (EM) emissions with and without a scrambler according to embodiments of system 10. EM emissions are plotted on the Y-axis against frequency on the X-axis. Line 122 indicates EM emissions with the scrambler, and line 124 indicates EM emissions without the scrambler. To reduce EM emissions, $A^2B$ protocol engine 40 may use scrambler 64, which may be applied to a portion of the data transmitted by node 12(1)-12(N). Substantially all of the data transmitted except for the preamble and a 2-bit frame count that follows the preamble may be scrambled in an example embodiment. In one specific embodiment, 1024 bits in a bus frame may be divided into a 64-bit control frame followed by downstream data and a 64-bit response frame followed by upstream data. The first 16 bits of the control frame and response frame (e.g., including the preamble and frame count) may not be scrambled. The remaining 48 bits of the control frame and response frame as well as any data being transmitted may be scrambled.

In one embodiment, scrambler 64 may use a 16-bit LFSR to generate a pseudo-random bit-stream. The LFSR may be based on polynomial $G(x)=x^{16}+x^{14}+x^{13}+x^{11}+1$ (where $x^{16}$ represents the $16^{th}$ bit, $x^{14}$ represents the $14^{th}$ bit, $x^{13}$ represents the $13^{th}$ bit and $x^{11}$ represents the $11^{th}$ bit). The LFSR also uses a different starting seed based on the 2-bit frame count so that a static data set may not cause a repeating pattern with an audio-rate frequency. The use of scrambler 64 may diffuse the EM emissions in the frequency domain as much as possible for a given data encoding method.

Figure 10:
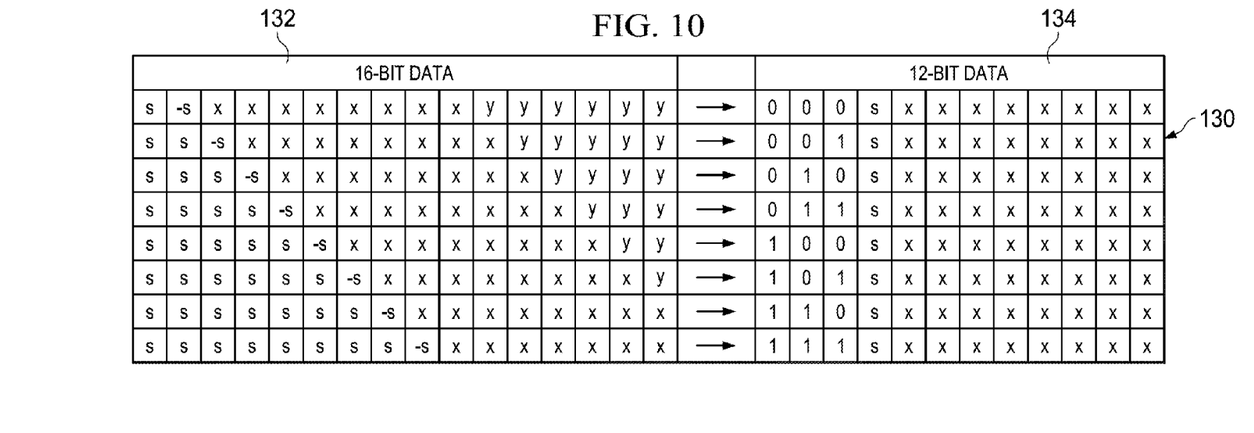
FIG. 10 is a simplified diagram illustrating yet other example details of an embodiment of the system.

Turning to FIG. 10, FIG. 10 is a simplified diagram illustrating compression 130 of 16 bit data 132 to 12 bit data 134 according to an embodiment of system 10. $A^2B$ protocol engine 40 may provide optional data compression/decompression so that less bandwidth can be used on $A^2B$ twisted wire pair bus 14 at a given data size with better quality than the next lower data size. In one embodiment, 3 bits indicating a number of repeated sign bits in the number followed by a sign bit and N–4 bits of data may be transmitted in the compressed format, where N is the $A^2B$ data size.

In an example embodiment, the optional floating-point data compression in $A^2B$ protocol engine 40 can be used on 16-bit, 20-bit, or 24-bit audio data. The compression mechanism may reduce the data size by 4 bits for transmission over twisted wire pair bus 14 and the data is translated back before it is transmitted from the node (e.g., via a serial port). The compression is accomplished by encoding the number of leading sign bits into the first 3 bits of the compressed data field, placing the sign bit in the following position, and using the remainder of the compressed data field to store as many remaining data bits as possible. Depending on the size of the number being compressed, up to 6 least significant bits (LSBs) of the input data may be discarded.

Figure 11:
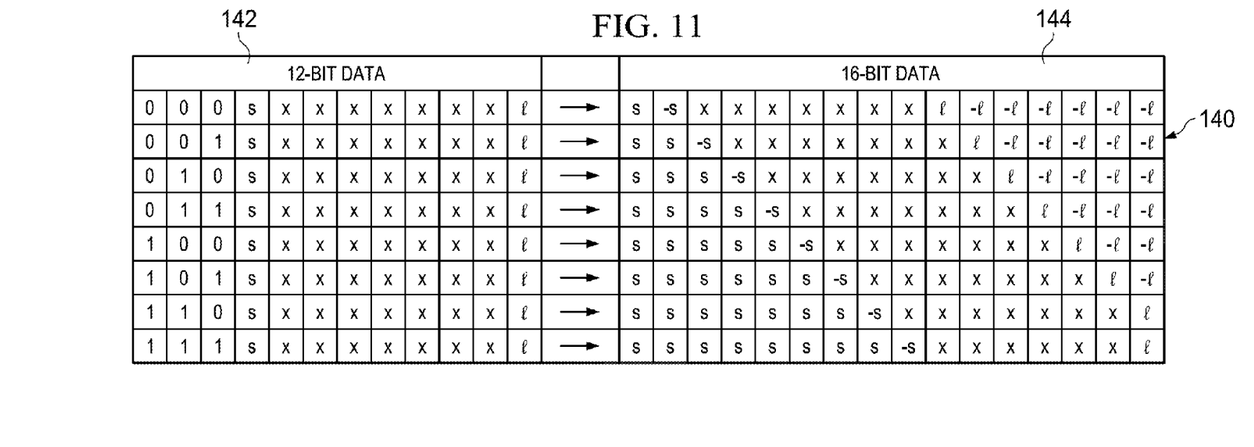
FIG. 11 is a simplified diagram illustrating yet other example details of an embodiment of the system.

Turning to FIG. 11, FIG. 11 is a simplified diagram illustrating decompression 140 from 12 bit compressed data 142 to 16 bit decompressed data 144. For decompression, the appropriate numbers of sign bits are placed in the most significant bits (MSBs) of the output followed by one bit, which is the inverse of the sign bit. The remaining data is placed after the inverse sign bit and any non-received bits are filled with the inverse of the LSB of the compressed data. Hence, decompressed data can be evenly distributed and may have no DC offset compared to the input.

Figure 12:
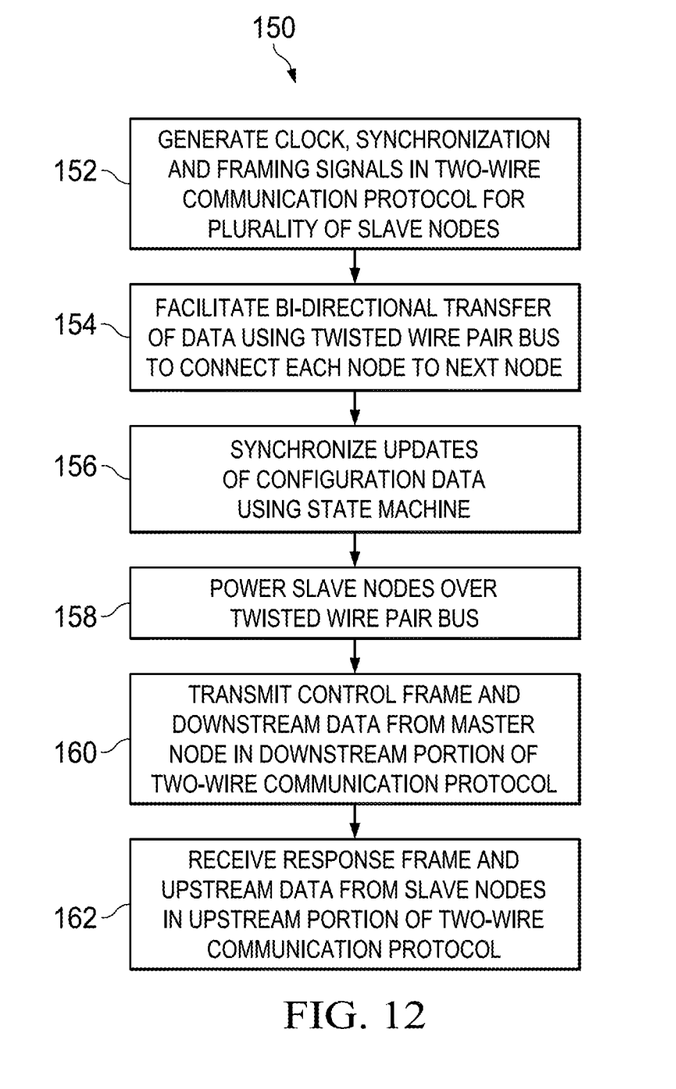
FIG. 12 is a simplified flow diagram illustrating example operations that may be associated with an embodiment of the system.

Turning to FIG. 12, FIG. 12 is a simplified flow diagram illustrating example operations 150 that may be associated with an embodiment of system 10. At 152, master node 12(1) may generate clock, synchronization and framing signals in two-wire communication protocol ($A^2B$ protocol). At 154, $A^2B$ protocol engine 40 may facilitate bi-directional transfer of data using twisted wire pair bus 14 to connect each node to the next node. At 156, $A^2B$ protocol engine 40 may synchronize updates of configuration data using state machine 100. At 158, master node 12(1) may power slave nodes 12(2)-12(N) over twisted wire pair bus 14. At 160, master node 12(1) may transmit the control frame and downstream data from master node 12(1) in downstream portion of the two-wire communication protocol. At 162, master node 12(1) may receive the response frame and upstream data from slave nodes 12(2)-12(N) in upstream portion of the two-wire communication protocol.

Figure 13:
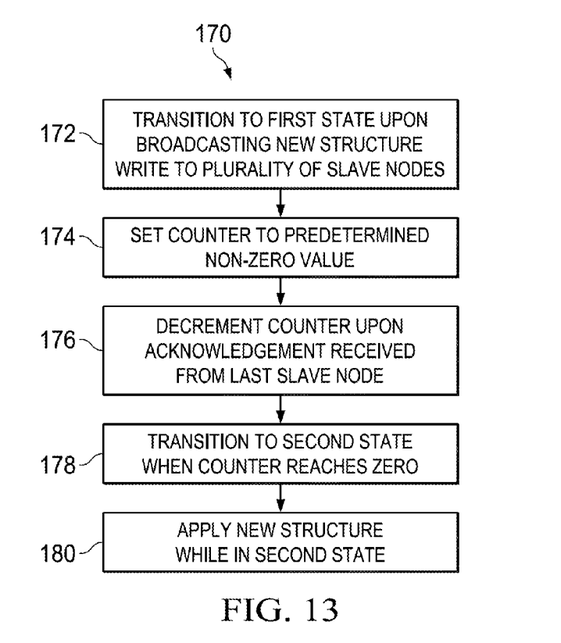
FIG. 13 is a simplified flow diagram illustrating other example operations that may be associated with an embodiment of the system.

Turning to FIG. 13, FIG. 13 is a simplified flow diagram illustrating example operations 170 that may be associated with an embodiment of system 10. At 172, state machine 100 transitions to a first state 104 upon master node 12(1) broadcasting a new structure write command to plurality of slave nodes 12(2)-12(N). At 174, a counter may be set to a predetermined non-zero value (e.g., 3). At 176, the counter may be decremented upon receipt of acknowledgement from last slave node 12(N). At 178, state machine 100 may transition to second state 104 when the counter reaches zero. At 180, the new structure may be applied while state machine 100 is in second state 104.

Figure 14:
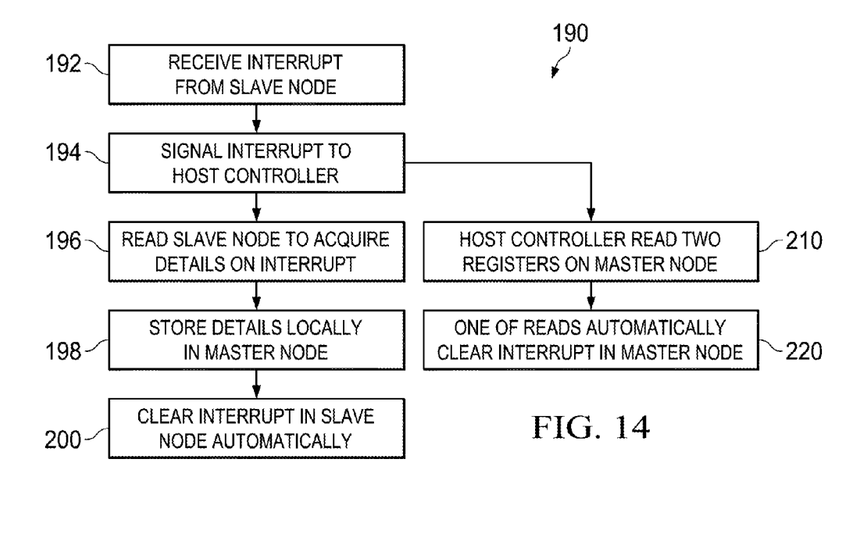
FIG. 14 is a simplified flow diagram illustrating yet other example operations that may be associated with an embodiment of the system.

Turning to FIG. 14, FIG. 14 is a simplified flow diagram illustrating example operations 190 that may be associated with an embodiment of system 10. At 192, master node 12(1) receives an interrupt from one of slave nodes 12(1)-12(N). At 194, master node 12(1) may signal the interrupt to host controller 18. At 196, master node 12(1) may read the slave node to acquire details on the interrupt. At 198, master node 12(1) stores details of the interrupt locally in master node 12(1). At 200, master node 12(1) may automatically clear the interrupt in the slave node. Going back to 194, at 210, host controller 18 may read two registers on master node 12(1) to retrieve details of the interrupt. At 220, one of the reads may automatically clear the interrupt in master node 12(1).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In the discussions of the embodiments above, the capacitors, clocks, DFFs, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and other peripheral devices may be attached to the board as plug-in cards, via cables, or integrated into the board itself.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the functionalities as described herein may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of components, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular component arrangements. Various modifications and changes may be made to such embodiments without departing from the scope of the appended claims. The description and drawings are, accordingly, to be regarded in an illustrative rather than in a restrictive sense.

Note that the activities discussed above with reference to the FIGURES are applicable to any integrated circuits that involve signal processing, particularly those that rely on synchronization signals to execute specialized software programs, or algorithms, some of which may be associated with processing digitized real-time data. Certain embodiments can relate to multi-DSP signal processing, floating point processing, signal/control processing, fixed-function processing, microcontroller applications, etc. In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can apply the functionalities described herein in high-precision data conversion products in battery monitoring, control systems, reporting controls, maintenance activities, etc.

In yet other example scenarios, the teachings of the present disclosure can be applicable in the industrial markets that include process control systems that help drive productivity, energy efficiency, and reliability. In consumer applications, the teachings of the electrical circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES, EXAMPLES, AND IMPLEMENTATIONS

Note that all optional features of the apparatus described above may also be implemented with respect to the method or process described herein and specifics in the examples may be used anywhere in one or more embodiments. In a first example, a system is provided (that can include any suitable circuitry, dividers, capacitors, resistors, inductors, ADCs, DFFs, logic gates, software, hardware, links, etc.) that can be part of any type of computer, which can further include a circuit board coupled to a plurality of electronic components. The system can include means for generating clock, synchronization and framing signals in a two-wire communication protocol for the plurality of slave nodes; means for facilitating bi-directional transfer of data using a twisted wire pair bus to connect each node to the next node; means for synchronizing updates of configuration data using a state machine; means for powering the slave nodes over the twisted wire pair bus; means for transmitting a control frame and downstream data from the master node in a downstream portion of the two-wire communication protocol, where a synchronization pattern at a beginning of the control frame is used as a time base by each slave node; and means for receiving a response frame and upstream data from the slave nodes in an upstream portion of the two-wire communication protocol.

The system can also include means for transitioning to a first state upon broadcasting a new structure write to the plurality of slave nodes; means for setting a counter to a predetermined non-zero value; means for decrementing the counter upon each acknowledgement received from the plurality of slave nodes; means for transitioning to a second state when the counter reaches zero; and means for applying the new structure while in the second state. The system can further include means for receiving an interrupt from a slave node; means for signaling the interrupt to a host controller; means for reading the slave node to acquire details on the interrupt; means for storing the details locally on the master node; and means for clearing the interrupt in the slave node automatically.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A master node circuit, comprising:
   a two-wire communication protocol engine for a master node to manage control and data transmissions according to a two-wire communication protocol in a bi-directional, multi-node bus system, wherein the two-wire communication protocol engine allows for synchronized updates of configuration data across the multi-node bus system, wherein the multi-node bus system comprises a plurality of slave nodes, including a particular slave node, connected to the master node on the bus system using a two wire bus to connect each node to a next node;
   wherein the configuration data specifies a number of downstream slots in which the slave node is to transmit its data, and a number of upstream slots in which the slave node is to transmit its data; and
   wherein a counter of the two-wire communication protocol engine is to be set to a predetermined start value upon transmission, by the master node, of new configuration data to the slave node, the counter is to change in response to acknowledgments received from the slave nodes, and the two-wire communication protocol engine is to apply the new configuration data after the counter reaches a predetermined end value.

2. The master node circuit of claim 1, wherein the two-wire communication protocol includes a downstream portion and an upstream portion, wherein a control frame and downstream data are transmitted from the master node in the downstream portion, wherein a response frame and upstream data are transmitted to the master node in the upstream portion, and wherein each slave node is to use a synchronization pattern at a beginning of the control frame as a time base.

3. The master node circuit of claim 2, wherein the two-wire communication protocol uses clock-first transition on zero Differential Manchester coding, and wherein the synchronization pattern is encoded using a modification of the Differential Manchester coding.

4. The master node circuit of claim 3, wherein the two-wire communication protocol engine includes a decoder block, and wherein the decoder block is to detect the synchronization pattern using a clock recovered from the two-wire bus.

5. The master node circuit of claim 2, wherein the downstream portion and the upstream portion each comprises 1024 bits, wherein the control frame and the response frame each comprise 64 bits, and wherein a first 16 bits of each of the control frame and the response frame comprises the synchronization pattern.

6. The master node circuit of claim 2, wherein the two-wire communication protocol engine includes a scrambler that scrambles a portion of the data transmitted over the two-wire bus, and wherein the synchronization pattern and a frame count in the control frame and the response frame are not scrambled.

7. The master node circuit of claim 6, wherein the scrambler is to use a linear feedback shift register (LFSR) to generate a pseudo-random bit-stream to scramble the portion of the data.

8. The master node circuit of claim 1, wherein the two-wire communication protocol engine is to signal an interrupt to a host controller after receiving the interrupt from the particular slave node.

9. The master node circuit of claim 8, wherein the two-wire communication protocol engine is to perform a read of the particular slave node to acquire details on the interrupt, store the details locally to the master node, and clear the interrupt in the particular slave node.

10. The master node circuit of claim 1, wherein the two-wire communication protocol engine is to transmit a value of the counter to the plurality of slave nodes as the counter changes.

11. The master node circuit of claim 10, wherein the counter is a first counter, the predetermined start value is a first predetermined start value, the predetermined end value is a first predetermined end value, the slave node includes a second counter that is set to a second predetermined start value in response to receipt of the new configuration data, the second counter changes in response to receipt of the value of the first counter, and the slave node is to apply the new configuration data after the second counter reaches a second predetermined end value.

12. The master node circuit of claim 11, wherein the first predetermined start value is a same value as the second predetermined start value.

13. The master node circuit of claim 1, wherein the configuration data includes a number of downstream slots for the slave node to retransmit, and a number of upstream slots for the slave node to retransmit.

14. The master node circuit of claim 1, wherein the configuration data includes a number of downstream slots for the slave node to consume, and a number of upstream slots for the slave node to consume.

15. A method for facilitating communication between a master node and a plurality of slave nodes, comprising:
   generating clock, synchronization and framing signals in a two-wire communication protocol for the plurality of slave nodes;
   facilitating bi-directional transfer of data using a two-wire bus to connect each node to the next node;
   synchronizing updates of configuration data across the plurality of slave nodes, wherein the configuration data includes a number of upstream data slots for a particular slave node to consume, and a number of downstream data slots for a particular slave node to consume; and
   powering the slave nodes over the two wire bus;
   wherein synchronizing updates of configuration data comprises setting a counter to a predetermined start value upon transmission of new configuration data to the plurality of slave nodes, changing the counter in response to acknowledgments received from the plurality of slave nodes, and applying the new configuration data after the counter reaches a predetermined end value.

16. The method of claim 15, further comprising:

transmitting a control frame and downstream data from the master node in a downstream portion of the two-wire communication protocol, wherein a synchronization pattern at a beginning of the control frame is used as a time base by each slave node; and receiving a response frame and upstream data from the slave nodes in an upstream portion of the two-wire communication protocol.

17. A slave node circuit, comprising:

a two-wire communication protocol engine for a slave node to manage control and data transmissions according to a two-wire communication protocol in a bi-directional, multi-node bus system, wherein the two-wire communication protocol engine allows for synchronized updates of configuration data across the multi-node bus system, wherein the multi-node bus system comprises a master node and a plurality of slave nodes, including the slave node, interconnected on the bus system using a two-wire bus to connect each node to a next node;

wherein the configuration data specifies a number of downstream slots in which the slave node is to transmit its data, and a number of upstream slots in which the slave node is to transmit its data; and wherein a counter of the two-wire communication protocol engine is to be set to a predetermined start value upon receipt, by the slave node from the master node, of new configuration data to the slave node, the counter is to change in response to updates from the master node, and the two-wire communication protocol engine is to apply the new configuration data after the counter reaches a predetermined end value.

18. The slave node circuit of claim 17, wherein the counter is a first counter, the predetermined start value is a first predetermined start value, the predetermined end value is a first predetermined end value, the master node includes a second counter that is set to a second predetermined start value in response to transmission of the new configuration data to the plurality of slave nodes, the second counter changes in response to receipt of acknowledgments from the plurality of slave nodes, and the master node is to apply the new configuration data after the second counter reaches a second predetermined end value.

19. The slave node circuit of claim 18, wherein the updates from the master node are values of the second counter.

20. The slave node circuit of claim 18, wherein the two-wire communication protocol engine is to apply the new configuration data upon concluding a first upstream transfer after the counter reaches a predetermined end value.

\* \* \* \* \*